(12) United States Patent
Choi et al.

(10) Patent No.: US 12,176,557 B2
(45) Date of Patent: Dec. 24, 2024

(54) BATTERY MODULE AND BATTERY PACK INCLUDING THE SAME

(71) Applicant: LG ENERGY SOLUTION, LTD., Seoul (KR)

(72) Inventors: Jonghwa Choi, Daejeon (KR); Junyeob Seong, Daejeon (KR); Myungki Park, Daejeon (KR); Jee Hoon Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 629 days.

(21) Appl. No.: 17/601,200

(22) PCT Filed: Jul. 10, 2020

(86) PCT No.: PCT/KR2020/009062
§ 371 (c)(1),
(2) Date: Oct. 4, 2021

(87) PCT Pub. No.: WO2021/015461
PCT Pub. Date: Jan. 28, 2021

(65) Prior Publication Data
US 2022/0166098 A1    May 26, 2022

(30) Foreign Application Priority Data

Jul. 19, 2019  (KR) .................. 10-2019-0087909
Jul. 6, 2020   (KR) .................. 10-2020-0082574

(51) Int. Cl.
*H01M 50/209* (2021.01)
*H01M 10/653* (2014.01)

(52) U.S. Cl.
CPC ....... *H01M 50/209* (2021.01); *H01M 10/653* (2015.04)

(58) Field of Classification Search
CPC ............ H01M 50/209; H01M 50/227; H01M 50/231; H01M 50/293
See application file for complete search history.

(56) References Cited

U.S. PATENT DOCUMENTS 6,048,642 A * 4/2000 Woolsey ............. H01M 50/209
                                                    429/100
7,088,075 B2    8/2006 Baba et al.
(Continued)

FOREIGN PATENT DOCUMENTS

JP    4263633 B2    6/2009
JP    2011-23268 A  2/2011
(Continued)

OTHER PUBLICATIONS

Translation of written opinion (no date) (Year: 0000).*
(Continued)

*Primary Examiner* — Amanda C. Walke
(74) *Attorney, Agent, or Firm* — Birch, Stewart, Kolasch & Birch, LLP

(57) ABSTRACT

A battery module includes a battery cell stack in which a plurality of battery cells are stacked; and a module frame for housing the battery cell stack. The module frame includes a first module frame having an opened upper part and a second module frame having an opened lower part. The first module frame includes a first side surface part, a second side surface part, and a bottom part for connecting the first side surface part and the second side surface part, wherein the second module frame includes a third side surface part, a fourth side surface part, and a ceiling part for connecting the third side surface part and the fourth side surface part. The first module frame and the second module frame surround the battery cell stack in a state where the first side surface part and the third (Continued)

side surface part are overlapped, and the second side surface part and the fourth side surface part are overlapped.

15 Claims, 9 Drawing Sheets

(56) References Cited

U.S. PATENT DOCUMENTS

| | | | | |
|---|---|---|---|---|
| 10,243,192 B2* | 3/2019 | Casebolt | ............... | H02J 7/00 |
| 10,686,172 B2* | 6/2020 | Lee | ............... | H01M 10/625 |
| 2008/0057393 A1 | 3/2008 | Onuki et al. | | |
| 2010/0255363 A1 | 10/2010 | Yoon et al. | | |
| 2011/0143193 A1* | 6/2011 | Ahn | ............... | H01M 50/103 |
| | | | | 429/176 |
| 2014/0030566 A1 | 1/2014 | Lee | | |
| 2014/0370363 A1* | 12/2014 | Oshiba | ............... | H01M 50/209 |
| | | | | 429/151 |
| 2017/0054307 A1* | 2/2017 | Kim | ............... | H01M 50/24 |
| 2017/0187082 A1* | 6/2017 | Zhao | ............... | H01M 10/625 |
| 2017/0190264 A1 | 7/2017 | Kim et al. | | |
| 2018/0151885 A1 | 5/2018 | Iwasaki et al. | | |
| 2018/0175464 A1 | 6/2018 | Kim et al. | | |
| 2019/0006647 A1 | 1/2019 | Ryu et al. | | |
| 2019/0131596 A1* | 5/2019 | Yang | ............... | H01M 50/224 |
| 2019/0291558 A1* | 9/2019 | Goto | ............... | H01M 50/209 |
| 2022/0140447 A1* | 5/2022 | Choi | ............... | H01M 50/211 |
| | | | | 429/163 |

FOREIGN PATENT DOCUMENTS

| | | | |
|---|---|---|---|
| JP | 2011-124204 A | 6/2011 | |
| JP | 2012-164431 A | 8/2012 | |
| JP | 5398628 B2 | 1/2014 | |
| JP | 2018-629186 A | 10/2018 | |
| KR | 10-0919390 B1 | 9/2009 | |
| KR | 10-0987413 B1 | 10/2010 | |
| KR | 10-2014-0015846 A | 2/2014 | |
| KR | 2016-35876 A | 3/2016 | |
| KR | 2016-181475 A | 10/2016 | |
| KR | 2017-504149 A | 2/2017 | |
| KR | 10-2017-0030954 A | 3/2017 | |
| KR | 10-2017-0053434 A | 6/2017 | |
| KR | 10-2018-0018109 A | 2/2018 | |
| KR | 10-1916720 B1 | 11/2018 | |
| KR | 10-2065098 B1 | 1/2020 | |
| WO | WO-2016185662 A1 * | 11/2016 | .......... H01M 10/613 |
| WO | WO 2017/026145 A | 2/2017 | |
| WO | WO 2019/066626 A1 | 5/2019 | |
| WO | WO-2020251207 A1 * | 12/2020 | .......... H01M 10/653 |

OTHER PUBLICATIONS

International Search Report (PCT/ISA/210) issued in PCT/KR2020/009062, dated Oct. 29, 2020.

Extended European Search Report for European Application No. 20844948.8, dated Mar. 31, 2022.

* cited by examiner

[FIG. 1]
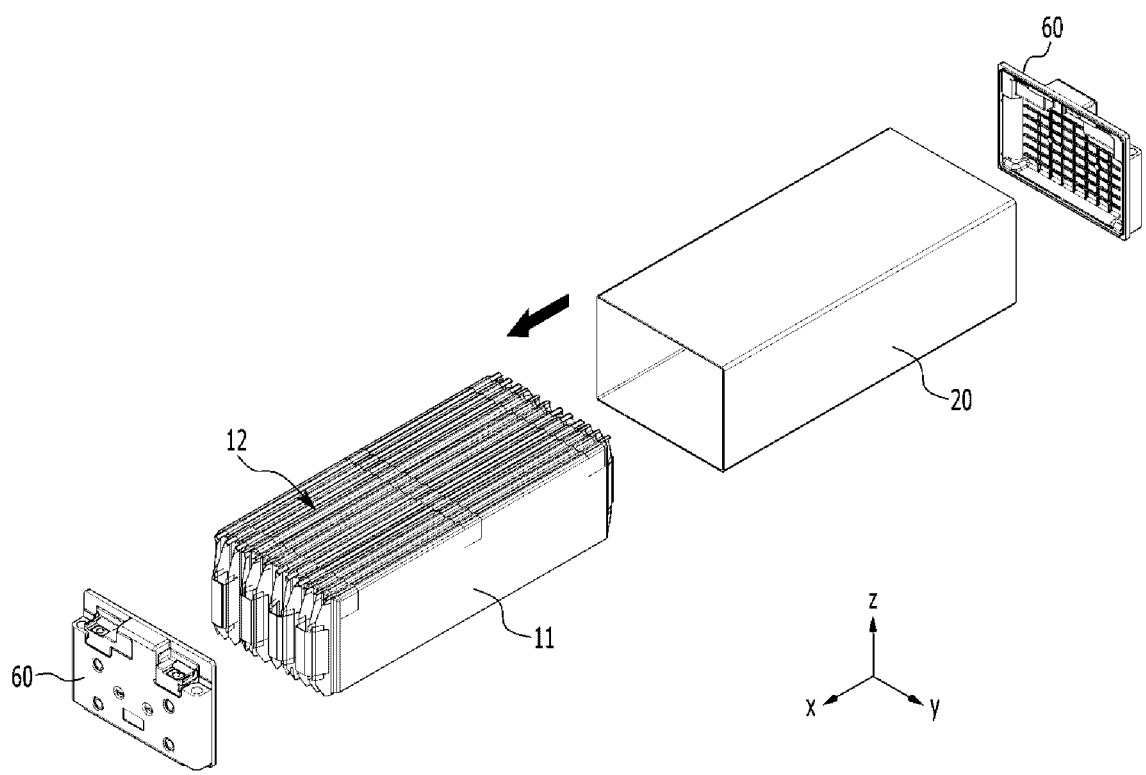
Prior Art

[FIG. 2]
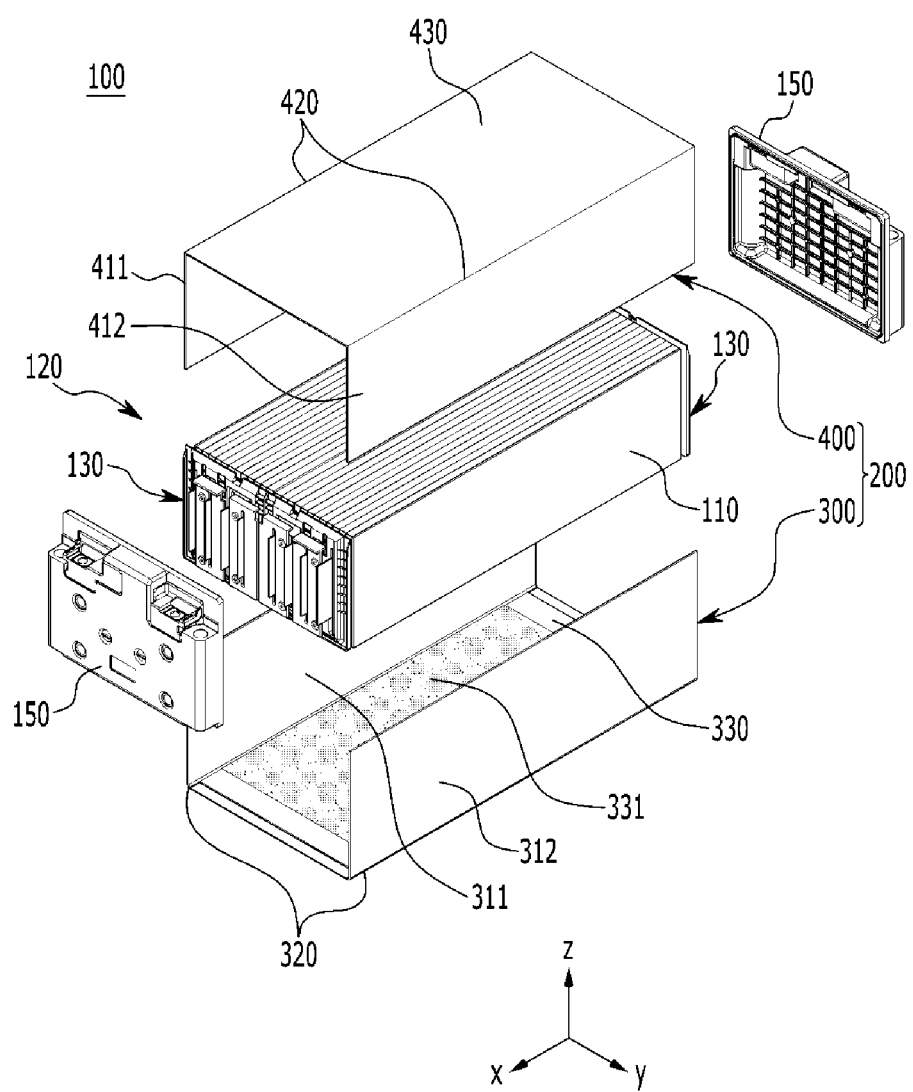

[FIG. 3]
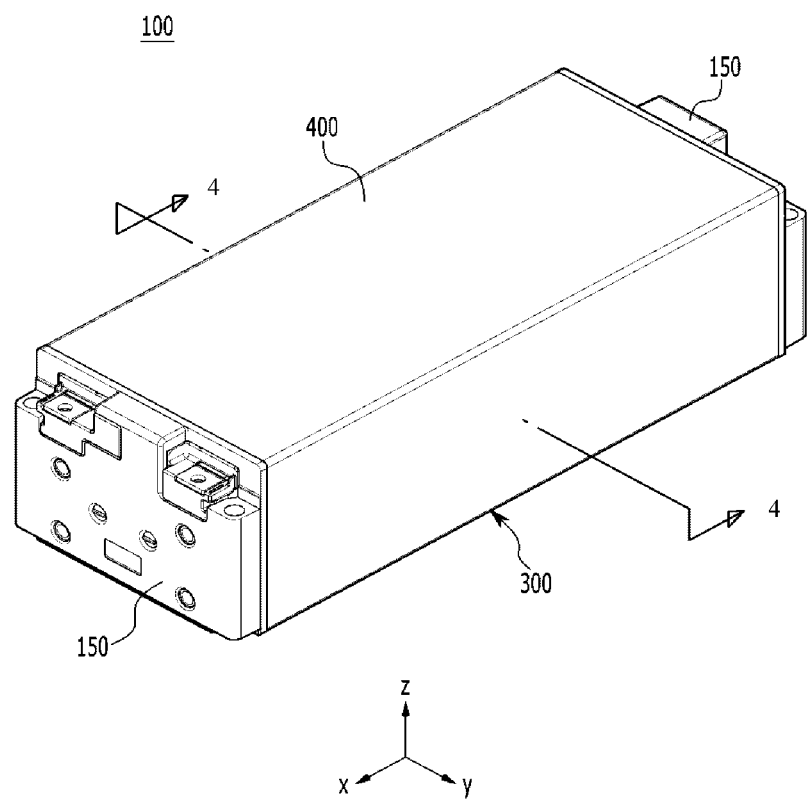

[FIG. 4]
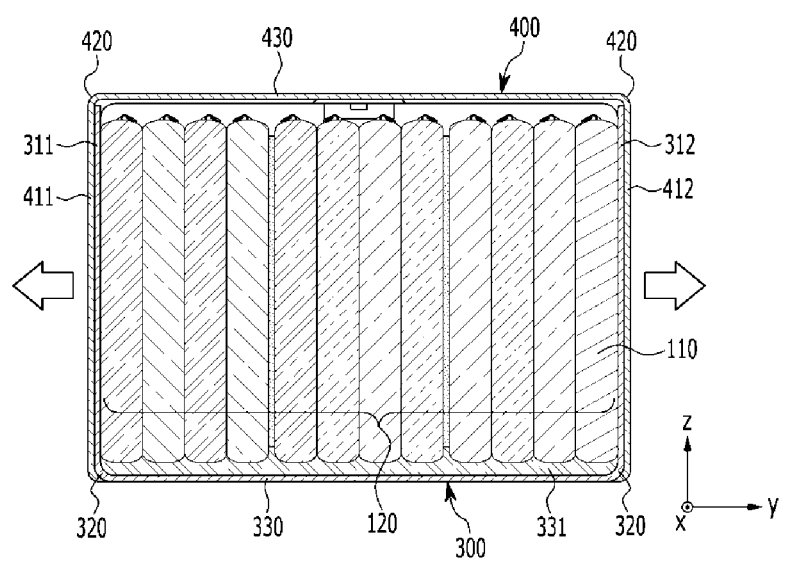

[FIG. 5]
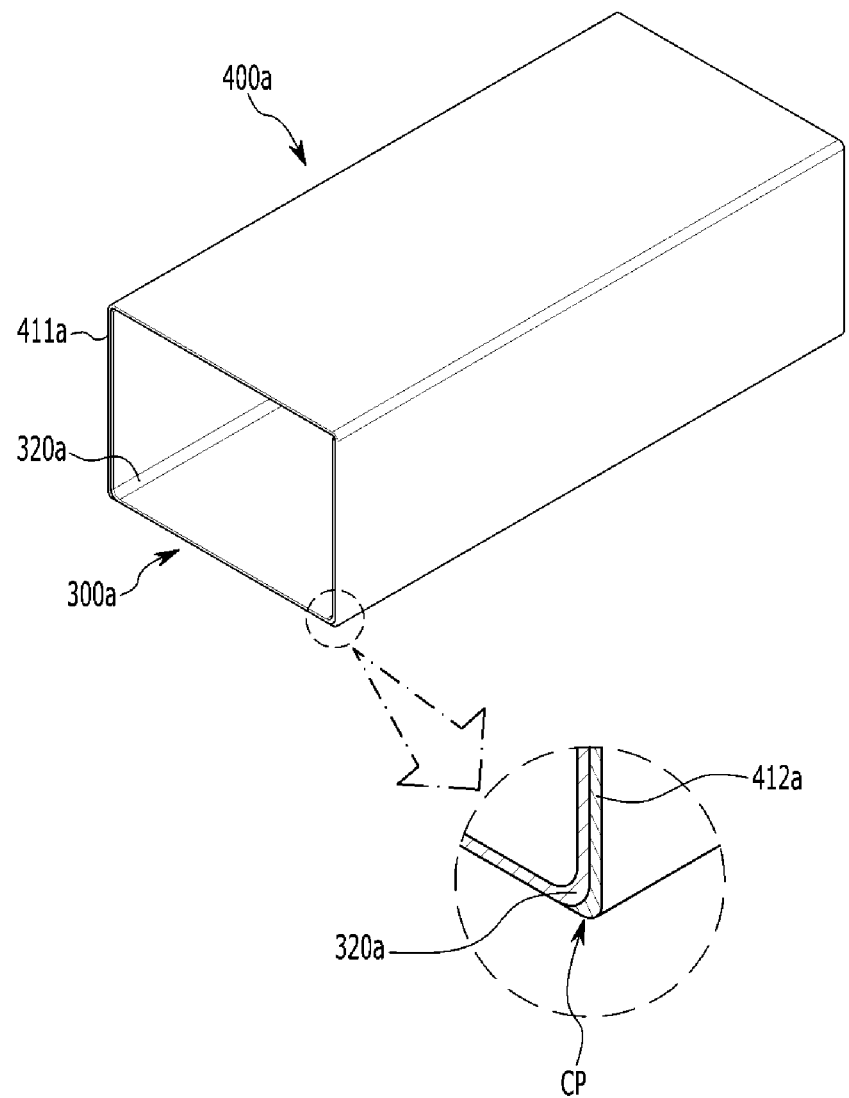

[FIG. 6]
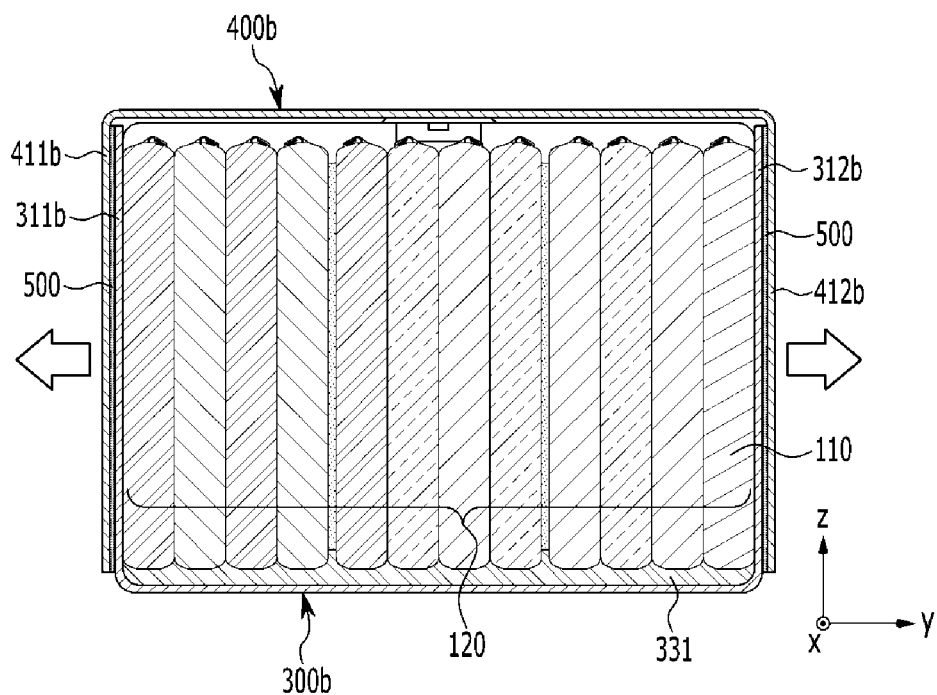

[FIG. 7]
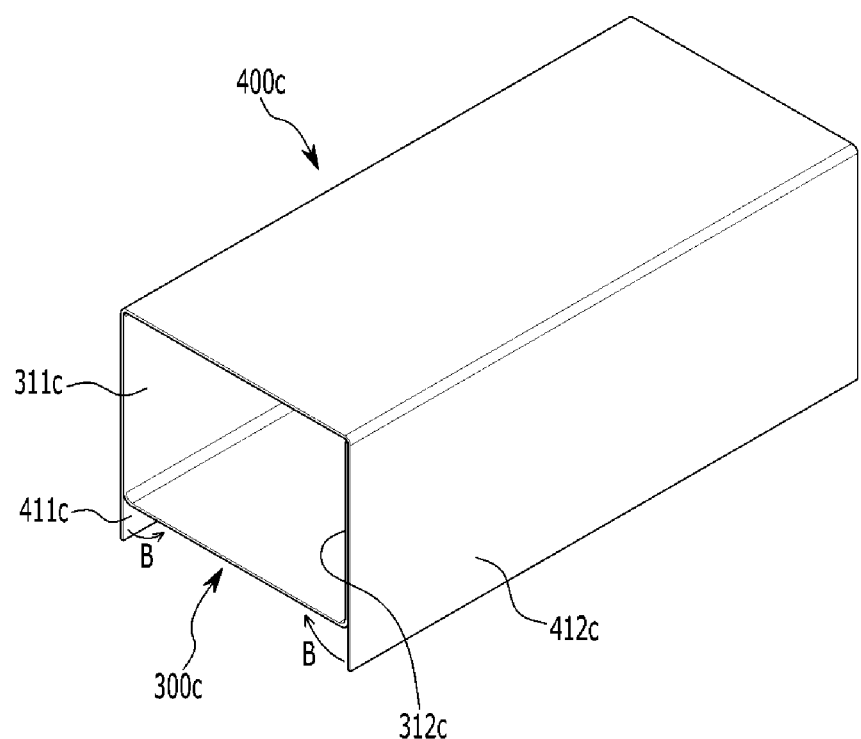

[FIG. 8]
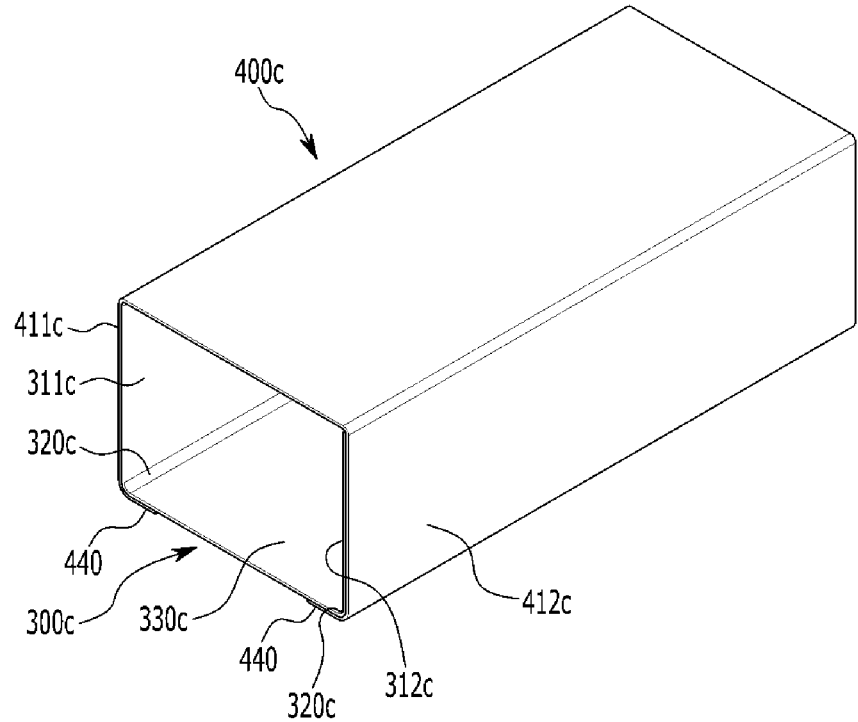
[FIG. 9]
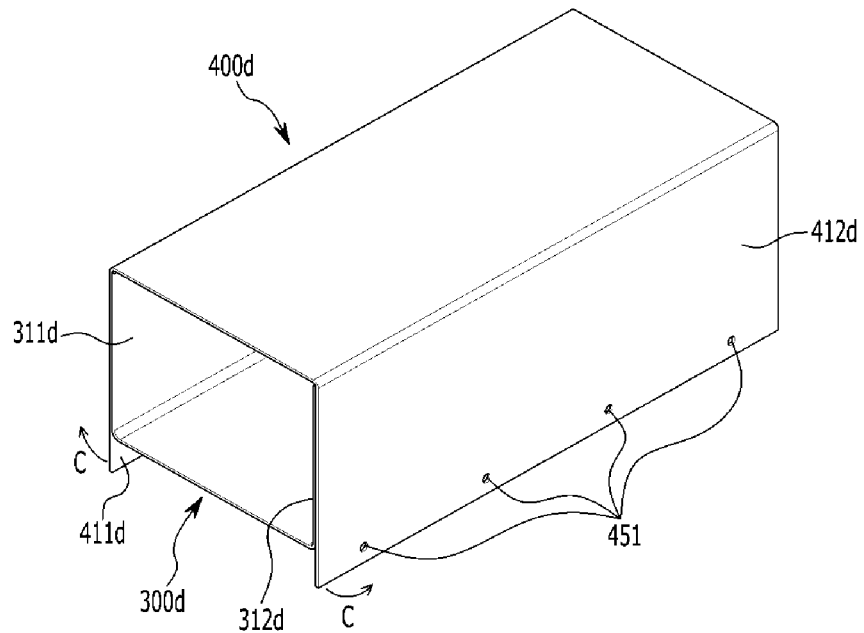

[FIG. 10]
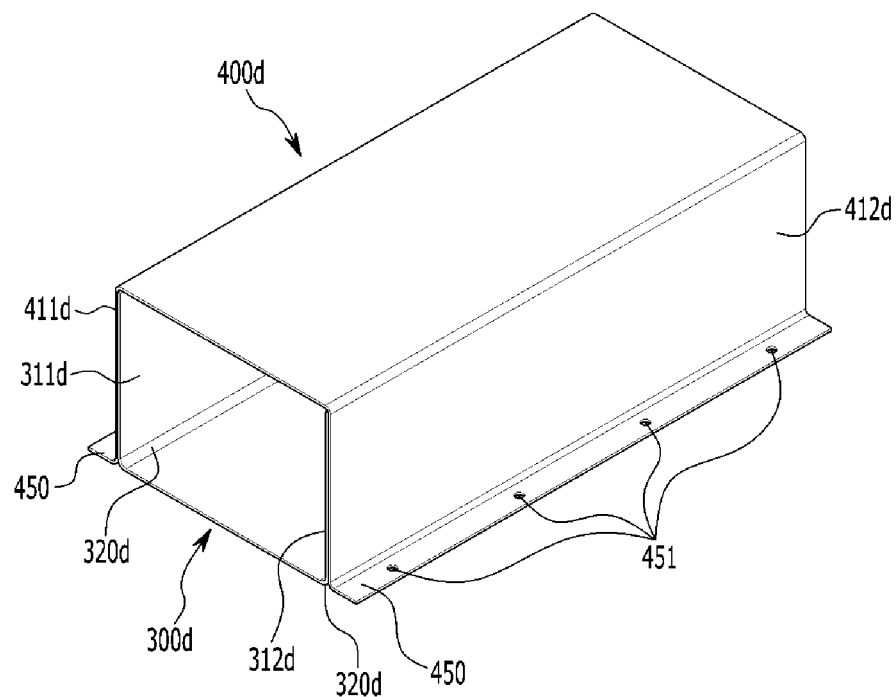
[FIG. 11]
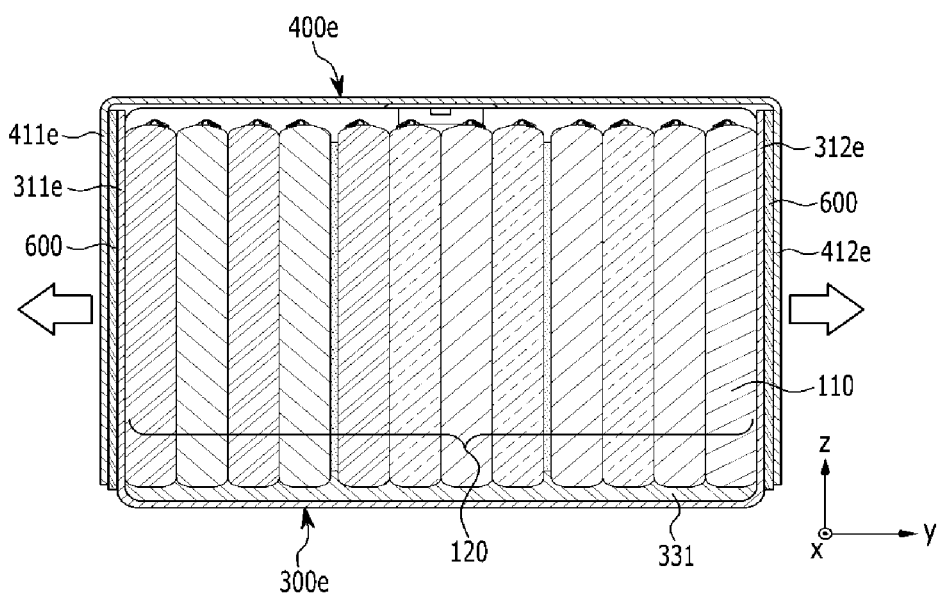

BATTERY MODULE AND BATTERY PACK INCLUDING THE SAME

CROSS CITATION WITH RELATED APPLICATION(S)

This application claims the benefit of Korean Patent Application No. 10-2019-0087909 filed on Jul. 19, 2019 and Korean Patent Application No. 10-2020-0082574 filed on Jul. 6, 2020 in the Korean Intellectual Property Office, each of which is incorporated herein by reference in its entirety.

TECHNICAL FIELD

The present disclosure relates to a battery module and a battery pack including the same, and more particularly to a battery module that can secure lateral rigidity without unnecessary weight increase, and a battery pack including the same.

BACKGROUND ART

Secondary batteries, which are easily applicable to various product groups and have electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

The middle- or large-sized battery module is preferably manufactured so as to have as small a size and weight as possible. Consequently, a prismatic battery, a pouch-shaped battery or the like, which can be stacked with high degree of integration and has a small weight relative to capacity, is usually used as a battery cell of the middle- or large-sized battery module. Meanwhile, in order to protect the battery cell stack from external shock, heat, or vibration, the battery module may include a frame member whose front and rear surfaces are opened to house a battery cell stack in an internal space.

FIG. 1 is an exploded perspective view illustrating a conventional battery module having a mono frame.

Referring to FIG. 1, the battery module may include a battery cell stack 12 formed by stacking a plurality of battery cells 11, a mono frame 20 whose front and rear surfaces are opened to cover the battery cell stack 12, and end plates 60 for covering the front and rear surfaces of the mono frame 20. In order to form such a battery module, it is necessary to horizontally assembly such that the battery cell stack 12 is inserted into the opened front or rear surfaces of the mono frame 20 along the X-axis direction as shown by the arrow in FIG. 1. However, in order to stably perform such a horizontal assembly, sufficient clearance must be secured between the battery cell stack 12 and the mono frame 20. Herein, the clearance refers to a gap generated by press-fitting or the like. When the clearance is small, it may lead to a damage of components in the process of the horizontal assembly.

At this time, a height of the mono frame 20 should be designed to be large in consideration of a maximum height of the battery cell stack 12 and an assembly tolerance in the inserting process. Therefore, an unnecessarily wasted space may occur.

Meanwhile, in the process of repeatedly charging and discharging a plurality of battery cells 11, the internal electrolyte is decomposed to generate gas, so that a phenomenon in which the battery cells 11 swell, that is, a swelling phenomenon, may occur. When the plurality of battery cells 11 stacked with a high degree of integration are swollen, the thickness of the mono frame 20 must be made thick to withstand this. However, when the thickness of the mono frame 20 is increased, the thickness of the upper and lower surfaces, which is irrelevant to the rigidity from the swelling phenomenon, is also increased, so that the weight of the battery module is unnecessarily increased.

In addition, a heat-conductive resin layer (not shown) may be formed between the battery cell stack 12 and the mono frame 20. The heat-conductive resin layer may serve to transfer heat generated from the battery cell stack to the outside of the battery module and fix the battery cell stack in the battery module. When the space in the battery module becomes large, the amount of the heat-conductive resin layer used may be increased more than necessary.

DETAILED DESCRIPTION OF THE INVENTION

Technical Problem

It is an object of the present disclosure to provide a battery module that improves a space utilization rate, can secure lateral rigidity without unnecessary weight increase, and minimizes the amount of heat-conductive resin used, and a battery pack including the same.

However, the problem to be solved by embodiments of the present disclosure is not limited to the above-described problems, and can be variously expanded within the scope of the technical idea included in the present disclosure.

Technical Solution

A battery module according to an embodiment of the present disclosure includes a battery cell stack comprising a plurality of stacked battery cells are stacked; and a module frame for housing the battery cell stack, wherein the module frame includes a first module frame having an opened upper part and a second module frame having an opened lower part, wherein the first module frame includes a first side surface part, a second side surface part, and a bottom part for connecting the first side surface part and the second side surface part, wherein the second module frame includes a third side surface part, a fourth side surface part, and a ceiling part for connecting the third side surface part and the fourth side surface part, and wherein the first module frame and the second module frame surround the battery cell stack where the first side surface part and the third side surface part are overlapped, and the second side surface part and the fourth side surface part are overlapped.

The first side surface part and the second side surface part of the first module frame extend to upper corners of the second module frame, and the third side surface part and the fourth side surface part of the second module frame extend to lower corners of the first module frame.

The plurality of battery cells may be stacked in an upright or inverted state so as to be parallel to the first side surface part, the second side surface part, the third side surface part, and the fourth side surface part.

The first side surface part may be located between the third side surface part and the battery cell stack, and the second side surface part may be located between the fourth side surface part and the battery cell stack.

Each lower edge of the third side surface part and the fourth side surface part may be welded to a lower corner of the first module frame to form a coupling part.

At least one of the third side surface part and the fourth side surface part may include a bent part that is extended than the first side surface part and the second side surface part and bent inward.

At least one of the third side surface part and the fourth side surface part may include a mounting part that is extended than the first side surface part and the second side surface part and bent outward.

The mounting part may be located adjacent to a lower corner of the first module frame.

One or more through holes may be formed in the mounting part.

The battery module may further include an adhesive member that is located between at least one of the first side surface part and the third side surface part and between the second side surface part and the fourth side surface part.

The battery module may further include a rigid member located between at least one of the first side surface part and the third side surface part and the second side surface part and the fourth side surface part.

The rigid member may include at least one of a plastic member and a metal plate material.

The first module frame may be a metal plate material in which the first side surface part, the second side surface part, and the bottom part are integrated, and the second module frame may be a metal plate material in which the third side surface part, the fourth side surface part and the ceiling part are integrated.

The battery module may further include a heat-conductive resin layer that is located between the bottom part and the battery cell stack.

Opposite side surfaces of the module frame may be thicker than the upper surface and the lower surface.

Advantageous Effects

According to the embodiments of the present disclosure, by arranging the module frame up and down, not only a clearance between the battery cell stack and the frame is reduced and the space utilization rate can be improved, but also the lateral rigidity can be secured without unnecessary weight increase.

In addition, the amount of heat-conductive resin applied can be minimized while improving the space utilization between the battery cell stack and the frame.

BRIEF DESCRIPTION OF THE DRAWINGS

FIG. 1 is an exploded perspective view showing a conventional battery module having a mono frame.

FIG. 2 is an exploded perspective view showing a battery module according to an embodiment of the present disclosure.

FIG. 3 is a perspective view showing a state in which components constituting the battery module of FIG. 2 are coupled.

FIG. 4 is a cross-sectional view taken along a cutting line 4-4 of FIG. 3.

FIG. 5 is a perspective view for explaining a welding coupling between a first module frame and a second module frame.

FIG. 6 is a cross-sectional view of a battery module for explaining the coupling between a first module frame and a second module frame through an adhesive member.

FIGS. 7 and 8 are perspective views for explaining a first module frame and a second module frame according to a modified embodiment of the present disclosure.

FIGS. 9 and 10 are perspective views for explaining a first module frame and a second module frame according to a modified embodiment of the present disclosure.

FIG. 11 is a cross-sectional view of a battery module for explaining a rigid member according to the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the drawings. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is an exploded perspective view showing a battery module 100 according to an embodiment of the present disclosure. FIG. 3 is a perspective view showing a state in which components constituting the battery module 100 of FIG. 2 are coupled.

Referring to FIGS. 2 and 3, the battery module 100 according to one embodiment of the present disclosure includes a battery cell stack 120 in which a plurality of battery cells 110 are stacked, and a module frame 200 for housing the battery cell stack 120.

The module frame 200 includes a first module frame 300 having an opened upper part and a second module frame 400 having an opened lower part. Further, both the first module frame 300 and the second module frame 400 are opened at their front and rear faces, an end plate 150 is located in the opened front and rear faces, and a busbar frame 130 is located between the battery cell stack 120 and the end plate 150.

Specifically, the first module frame 300 includes a first side surface part 311, a second side surface part 312, and a bottom part 330, wherein the first side surface part 311 and the second side surface part 312 are parallel to each other, and the bottom part 330 connects the first side surface part 311 and the second side surface part 312. That is, the first module frame 300 has a plate-shaped structure bent so as to continuously surround both side surfaces and the bottom surface of the battery cell stack 120, and may be a metal plate material in which the first side surface part 311, the second side surface part 312, and the bottom part 330 are integrated. Further, the first module frame 300 may be a U-shaped frame in which the cross-sectional shape cut along the yz plane looks like a U-shape, but is not limited thereto.

The second module frame 400 includes a third side surface part 411, a fourth side surface part 412, and a ceiling part 430, wherein the third side surface part 411 and the fourth side surface part 412 are parallel to each other, and the ceiling part 430 connects the third side surface part 411 and the fourth side surface part 412. That is, the second module frame 400 has a plate-shaped structure bent so as to continuously surround both side surfaces and the upper surface of the battery cell stack 120, and may be a metal plate material in which the third side surface part 411, the fourth side surface part 412, and the ceiling part 430 are integrated. Further, the second module frame 400 may be a U-shaped frame in which the cross-sectional shape cut along the yz plane looks like a U-shape, but is not limited thereto.

The first module frame 300 and the second module frame 400 surround the top, bottom and both side surfaces of the battery cell stack 120, in a state where the first side surface part 311 and the third side surface part 411 are overlapped, and the second side surface part 312 and the fourth side surface part 412 are overlapped. This part will be described again with reference to FIG. 4 below.

FIG. 4 is a cross-sectional view taken along a cutting line 4-4 of FIG. 3.

Referring to FIG. 4, in a state where the first side surface part 311 and the third side surface part 411 are overlapped and the second side surface part 312 and the fourth side surface part 412 are overlapped, the battery cell stack 120 is housed between the first module frame 300 and the second module frame 400.

Each of the plurality of battery cells 110 constituting the battery cell stack 120 is preferably stacked in an upright or inverted state so as to be parallel to the first and second side surface parts 311 and 312 of the first module frame 300, and the third and fourth side surface parts 411 and 412 of the second module frame 400.

At this time, when the charging/discharging processes of the battery cells 110 are repeated, the internal electrolyte is decomposed to generate gas, and a swelling phenomenon in which an external shape thereof swells may occur. In particular, considering the stacking direction of the battery cells 110, it may swell mainly in the direction of the arrow (Y-axis direction and opposite direction thereof) in FIG. 4, and as the number of battery cells 110 increases, the internal pressure increases due to the swelling phenomenon.

In order to withstand such swelling phenomenon, the frame surrounding the battery cell stack must have a rigidity at a prescribed level or more, and for that purpose, the thickness needs to be made thick to some extent. In the case of the conventional mono frame 20 shown in FIG. 1, when the thickness is increased, the thickness of the upper surface and the lower surface, which is irrelevant to the swelling phenomenon, is also increased, and thus, the weight of the battery module is unnecessarily increased.

Unlike the conventional mono frame 20, the module frame in the present embodiment may be formed from a first module frame 300 and a second module frame 400, that is, two module frames 300 and 400, and the first side surface part 311 and the third side surface part 411 are overlapped, and the second side surface part 312 and the fourth side surface part 412 are overlapped, so that both side surfaces can form a thicker structure than the upper surface and the lower surface. That is, both side surfaces of the module frame may be implemented to be thicker so that the swelling phenomenon of the battery cell 110 can be directly controlled, and at the same time, the upper and lower surfaces are implemented to be relatively thin, thereby being able to prevent the volume and weight of the battery module from being unnecessarily increased.

In the case of middle- or large-sized devices, since a plurality of such battery modules are assembled and formed, reducing unnecessary volume or weight of each of the battery modules may have a significant effect on improving the energy density as an energy storage device or increasing an overall space efficiency.

On the other hand, referring back to FIG. 4 together with FIG. 2, the first module frame 300 has a structure in which a metal plate material is bent, wherein lower corners 320 are formed between the first side surface part 311 and the bottom part 330, and between the second side surface part 312 and the bottom part 330, respectively. Similarly, the second module frame 400 also has a structure in which a metal plate material is bent, wherein upper corners 420 are formed between the third side surface part 411 and the ceiling portion 430 and between the fourth side surface part 412 and the ceiling portion 430, respectively.

In this case, the first side surface part 311 and the second side surface part 312 of the first module frame 300 may be extended up to the upper corners 420 of the second module frame 400, and the third side surface part 411 and the fourth side surface part 412 of the second module frame 400 may be extended up to lower corners 320 of the first module frame 300.

When the swelling phenomenon occurs in the battery cell 110, a deformation force may be locally concentrated not only on the first to fourth side surface parts 311, 312, 411 and 412 but also on the corners, which may cause a problem that cracking occurs at the corners.

Thus, the first side surface part 311 and the second side surface part 312 of the first module frame 300 form a structure extending to the upper corners 420 of the second module frame 400, and the third side surface part 411 and the fourth side surface part 412 of the second module frame 400 form a structure extending to the lower corners 320 of the first module frame 300, and thereby, the deformation force applied to the corners can complement each other between the first module frame 300 and the second module frame 400.

On the other hand, in the conventional mono frame 20 of FIG. 1, the battery cell stack 12 was horizontally inserted along the X-axis direction as shown by an arrow. In the same way that the mono frame 20 should not get stuck on maximum height of the configuration of the battery cell stack 12 during horizontal insertion, the assembly tolerance at the time of insertion must be considered, so that it was necessary to design the height of the mono frame 20 with a margin.

In contrast, in the module frame 200 of FIG. 2, the battery cell stack 120 can be assembled along a vertical direction Z (a direction opposite to the Z axis) via the opened upper part of the first module frame 300 and the opened lower part of the second module frame 400. Therefore, the height of the module frame 200 can be set lower, thereby configuring a more compact battery module. That is, since the clearance between the battery cell stack and the frame can be reduced to increase the space utilization rate, the capacity and output of the battery module 100 can be more improved.

On the other hand, referring back to FIG. 4, the first side surface part 311 may be located between the third side surface part 411 and the battery cell stack 120, and the second side surface part 312 may be located between the fourth side surface part 412 and the battery cell stack 120.

In other words, the second module frame 400 may form a wider width than the first module frame 300 with respect to the Y-axis direction, so that the second module frame 400 may be located further outside with respect to the battery cell stack 120.

Of course, the first module frame 300 forms a wider width and thus is located further outside with respect to the battery cell stack 120, or it can be configured such that the first module frame 300 and the second module frame 400 are alternately located, but considering the order or ease of the process, it is more preferable that the second module frame 400 covering the upper part of the battery cell stack 120 forms a wider width as shown in FIG. 4.

Specifically, a heat-conductive resin layer 331 described hereinafter is formed on the bottom part 330 of the first module frame 300, and the battery cell stack 120 is disposed on the heat-conductive resin layer 331. At this time, in the process of applying a heat-conductive resin to the bottom part 330 to form the heat-conductive resin layer 331, or of disposing the battery cell stack 120 on the heat-conductive resin layer 331, the first side surface part 311 and the second side surface part 312 of the first module frame 300 may perform the role like a kind of guide member.

Further, the battery cell stack 120 is disposed on the first module frame 300 and then the second module frame 400 is assembled in a vertical direction (a direction opposite to the Z axis), and thus, the second module frame 400 has a wider width in the Y-axis direction than the first module frame 300, so that inserting the third side surface part 411 and the fourth side surface part 412 to the outside of the first side surface portion 311 and the second side surface part 312, respectively may make assembly easier.

FIG. 5 is a perspective view for explaining the welding coupling of the first module frame and the second module frame, other configurations are omitted for convenience of description, and only the first module frame 300a and the second module frame 400a are shown.

Referring to FIG. 5, in a state in which the ends of the extended third side surface part 411a and the fourth side surface part 412a of the second module frame 400a are in contact with the lower corners 320a of the first module frame 300a, they may be coupled by welding or the like. That is, each of the lower corners 320a of the first module frame 300a is coupled with the end of the third side surface part 411a and the end of the fourth side surface part 412a of the second module frame 400a corresponding thereto by a method such as welding, so that the coupling part CP may be formed. In FIG. 5, only a state in which the fourth side surface part 412a and the lower corner 320a are weld-coupled to form a coupling part CP is shown in detail, but it goes without saying that the extended end part of the third side surface part 411a may also form a coupling part as described above.

FIG. 6 is a cross-sectional view of a battery module for explaining the coupling between a first module frame and a second module frame via an adhesive member.

Referring to FIG. 6, the battery module according to the present embodiment may further include an adhesive member 500 located in at least one of between the first side surface part 311b and the third side surface part 411b and between the second side surface part 312b and the fourth side surface part 412b. The adhesive member 500 is for fastening or coupling between the first module frame 300b and the second module frame 400b, and may include a resin or an adhesive tape including an adhesive material.

Since the method of applying the adhesive member 500 is not limited, the second module frame 400b can be assembled after applying or adhering the adhesive member 500 to the outer surfaces of the first side surface part 311b and the second side surface part 312b, and the second module frame 400b may be assembled after applying or adhering the adhesive member 500 to the inner surfaces of the third side surface part 411b and the fourth side surface part 412b.

The adhering method in FIG. 5 or 6 corresponds to embodiments for coupling the first module frames 300a and 300b and the second module frames 400a and 400b, and in the present disclosure, in addition to welding coupling or adhesive members, methods such as bonding, bolting, and riveting may be applied without limitation.

Meanwhile, referring back to FIG. 2, a heat-conductive resin may be applied to the bottom part 330 of the first module frame 300 to form a heat-conductive resin layer 331.

In the mono frame 20 of FIG. 1, since the heat-conductive resin is injected through the injection port of the mono frame 20 after inserting the battery cell stack 12, there was a problem that the heat-conductive resin is injected more than necessary.

In the present embodiment, since the battery cell stack 120 is located after the heat-conductive resin is applied in advance, it is possible to prevent excessive injection than necessary as in the conventional case.

The heat-conductive resin of the heat-conductive resin layer 331 may include a heat-conductive adhesive material, and specifically, it may include at least one of a silicone material, a urethane material, and an acrylic material. The heat-conductive resin is liquid during application but is solidified after application, and thus may perform a role of fixing one or more battery cells 110 constituting the battery cell stack 120. Further, it has excellent heat conduction characteristics, and can quickly transfer heat generated from the battery cell 110 to a heat sink (not shown) located under the battery module, thereby preventing the battery module from overheating.

FIGS. 7 and 8 are perspective views for explaining a first module frame 300c and a second module frame 400c according to a modified embodiment of the present disclosure, other configurations are omitted for convenience of description, and only the module frame 300c and the second module frame 400c are shown.

Referring to FIG. 7, at least one of the third side surface part 411c and the fourth side surface part 412c may extend longer than the first side surface part 311c and the second side surface part 312c, and the extended part can be bent inward (B direction).

FIG. 8 is a view showing the state after the extended part in FIG. 7 is bent inward, and referring to FIG. 8, the extended parts of the third side surface part 411c and the fourth side surface part 412c are bent to form a bent part 440.

By forming the bent part 440, not only mechanical fastening between the first module frame 300c and the second module frame 400c is possible, but also the deformation force applied to the lower corner 320c of the first module frame 300c due to the above-mentioned swelling phenomenon may be further compensated through the bent part 440.

Meanwhile, although not specifically shown, welding may be further performed between the bottom part 330c and the end of the bent part 440.

FIGS. 9 and 10 are perspective views for explaining the first module frame 300d and the second module frame 400d according to the modified embodiment of the present disclosure, other configurations are omitted for convenience of description, and only the first module frame 300d and the second module frame 400d are shown.

Referring to FIG. 9, at least one of the third side surface part 411d and the fourth side surface part 412d may be extended longer than the first side surface part 311d and the second side surface part 312d, and the extended portion may be bent outward (C direction). In this case, one or more through holes 451 may be further formed in the extended parts of the third side surface part 411d and the fourth side surface part 412d.

FIG. 10 is a view showing a state after the extended part in FIG. 9 is bent outward, and referring to FIG. 10, the extended parts of the third side surface part 411d and the fourth side surface part 412d are bent to form a mounting part 450.

In implementing a battery pack including a plurality of battery modules, a device for securing the battery module to the pack frame (not shown) is necessary. This is because when the battery pack is applied to a device described hereinafter, it is necessary to secure safety against external vibration or shock.

According to a conventional one, the pack frame was fixed by forming a separate fastening structure at four side surface corners of the battery module, but in the present embodiment, the battery module may be fixed to the pack frame (not shown) by forming a mounting part 450.

In particular, a plurality of through holes 451 are formed in the mounting part 450 of FIGS. 9 and 10, and bolts may be inserted through the through holes 451 to be fastened to a pack frame (not shown). The number of through holes 451 is not particularly limited, but it is preferable that for firm fixation, the number is two or more as shown in FIG. 10.

However, the through holes 451 in FIGS. 9 and 10 are examples showing an example of a fixing method utilizing the mounting part 450, and a shape in which the mounting part 450 is fixed to the pack frame by utilizing an adhesive member or welding without these through holes 451 can also be used as a modified example.

The swelling of the battery cell stack can be easily controlled through the second module frame 400d in which the mounting part 450 is formed, and at the same time, the battery module can be fixed to the pack frame even without separately forming a fastening structure. Further, various fixing and fastening structures may be applied by the mounting part 450, such as bolt fastening through a through hole, adhering through an adhesive member, and welding coupling, and the like.

In addition, in order to control the swelling of the battery cell stack and to reduce the deformation force at the corners, it is preferable that the third side surface part 411d and the fourth side surface part 412d are extended up to the lower corners 320d of the first module frame 300d, and the mounting parts 450 are located adjacent to the lower corners 320d, respectively.

FIG. 11 is a cross-sectional view of a battery module for explaining a rigid member.

Referring to FIG. 11, the battery module according to the present embodiment may further include a rigid member 600 that is located in at least one of between the first side surface part 311e and the third side surface part 411e and between the second side surface part 312e and the fourth side surface part 412e.

In contrast to the swelling phenomenon in which the battery cells 110 constituting the battery cell stack 120 swell in an arrow direction (Y-axis direction and an opposite direction thereof), the rigid member 600 can be disposed at the above-mentioned position to secure an additional rigidity. For this purpose, the rigid member 600 preferably includes at least one of a plastic member and a metal plate material.

In addition to the above-mentioned configuration in which the first to fourth side surface parts 311e, 312e, 411e and 412e are overlapped, a rigid member 600 may be additionally inserted in consideration of the number of the battery cells 110 constituting the battery cell stack 120 or the degree of swelling. As in the present embodiment, the module frame formed of the two module frames 300e and 400e has a configuration that facilitates additional insertion of the rigid member 600.

On the other hand, although not specifically shown, if necessary, the adhesive member in FIG. 6 is further located between each of the first to fourth side surface parts 311e, 312e, 411e and 412e and the rigid member 600 to secure the adhesive force.

One or more battery modules according to the present embodiment described above may be mounted together with various control and protection systems such as a battery management system (BMS) and a cooling system to form a battery pack.

The battery module or the battery pack including the battery module may be applied to various devices. These devices may be applied to vehicles such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110: battery cell
120: battery cell stack
300: first module frame
331: heat-conductive resin layer
400: second module frame

The invention claimed is:
1. A battery module comprising:
a battery cell stack comprising a plurality of stacked battery cells; and
a module frame for housing the battery cell stack,
wherein the module frame includes a first module frame having an opened upper part and a second module frame having an opened lower part,
wherein the first module frame includes a first side surface part, a second side surface part, and a bottom part for connecting the first side surface part and the second side surface part,
wherein the second module frame includes a third side surface part, a fourth side surface part, and a ceiling part for connecting the third side surface part and the fourth side surface part,
wherein the first module frame and the second module frame surround the battery cell stack where the first side surface part and the third side surface part are overlapped, and the second side surface part and the fourth side surface part are overlapped,
wherein the plurality of battery cells are stacked in an upright or inverted state so as to be parallel to the first side surface part, the second side surface part, the third side surface part, and the fourth side surface part,
wherein the first side surface part and the second side surface part of the first module frame extend to upper corners of the second module frame,
wherein the third side surface part and the fourth side surface part of the second module frame extend to lower corners of the first module frame, and
wherein opposite side surfaces of the module frame are thicker than the upper surface and the lower surface.

2. The battery module as set forth in claim 1, wherein the first side surface part is located between the third side surface part and the battery cell stack, and
wherein the second side surface part is located between the fourth side surface part and the battery cell stack.

3. The battery module as set forth in claim 2, wherein each lower edge of the third side surface part and the fourth side surface part is welded to a lower corner of the first module frame to form a coupling part.

4. The battery module as set forth in claim 1, further comprising an adhesive member located between at least one of the first side surface part and the third side surface part and the second side surface part and the fourth side surface part.

5. The battery module as set forth in claim 1, wherein the first module frame is a metal plate material in which the first side surface part, the second side surface part, and the bottom part are integrated, and
wherein the second module frame is a metal plate material in which the third side surface part, the fourth side surface part and the ceiling part are integrated.

6. The battery module as set forth in claim 1, further comprising a heat-conductive resin layer located between the bottom part and the battery cell stack.

7. A battery module comprising:
a battery cell stack comprising a plurality of stacked battery cells; and
a module frame for housing the battery cell stack,
wherein the module frame includes a first module frame having an opened upper part and a second module frame having an opened lower part,
wherein the first module frame includes a first side surface part, a second side surface part, and a bottom part for connecting the first side surface part and the second side surface part,
wherein the second module frame includes a third side surface part, a fourth side surface part, and a ceiling part for connecting the third side surface part and the fourth side surface part,
wherein the first module frame and the second module frame surround the battery cell stack where the first side surface part and the third side surface part are overlapped, and the second side surface part and the fourth side surface part are overlapped,
wherein the first side surface part is located between the third side surface part and the battery cell stack,
wherein the second side surface part is located between the fourth side surface part and the battery cell stack, and
wherein at least one of the third side surface part and the fourth side surface part includes a bent part that is extended further than the first side surface part and the second side surface part and bent inward.

8. A battery pack comprising one or more battery modules as set forth in claim 7.

9. A battery module comprising:
a battery cell stack comprising a plurality of stacked battery cells; and
a module frame for housing the battery cell stack,
wherein the module frame includes a first module frame having an opened upper part and a second module frame having an opened lower part,
wherein the first module frame includes a first side surface part, a second side surface part, and a bottom part for connecting the first side surface part and the second side surface part,
wherein the second module frame includes a third side surface part, a fourth side surface part, and a ceiling part for connecting the third side surface part and the fourth side surface part,
wherein the first module frame and the second module frame surround the battery cell stack where the first side surface part and the third side surface part are overlapped, and the second side surface part and the fourth side surface part are overlapped,
wherein the first side surface part is located between the third side surface part and the battery cell stack,
wherein the second side surface part is located between the fourth side surface part and the battery cell stack, and
wherein at least one of the third side surface part and the fourth side surface part includes a mounting part that is extended further than the first side surface part and the second side surface part and bent outward.

10. The battery module as set forth in claim 9, wherein the mounting part is located adjacent to a lower corner of the first module frame.

11. The battery module as set forth in claim 9, wherein one or more through holes are formed in the mounting part.

12. A battery pack comprising one or more battery modules as set forth in claim 9.

13. A battery module comprising:
a battery cell stack comprising a plurality of stacked battery cells; and
a module frame for housing the battery cell stack,
wherein the module frame includes a first module frame having an opened upper part and a second module frame having an opened lower part, wherein the first module frame includes a first side surface part, a second side surface part, and a bottom part for connecting the first side surface part and the second side surface part, wherein the second module frame includes a third side surface part, a fourth side surface part, and a ceiling part for connecting the third side surface part and the fourth side surface part, wherein the first module frame and the second module frame surround the battery cell stack where the first side surface part and the third side surface part are overlapped, and the second side surface part and the fourth side surface part are overlapped, and wherein a rigid member is located between at least one of the first side surface part and the third side surface part and between the second side surface part and the fourth side surface part.

14. The battery module as set forth in claim 13, wherein the rigid member includes at least one of a plastic member and a metal plate material.

15. A battery pack comprising one or more battery modules as set forth in claim 1.

* * * * *